(12) United States Patent
Dupuy et al.

(10) Patent No.: US 6,398,479 B1
(45) Date of Patent: Jun. 4, 2002

(54) UNDER-VEHICLE LIFT WITH FOLDING PLATFORM

(75) Inventors: James R. Dupuy, Winamac; Fred William Malchow, Star City, both of IN (US)

(73) Assignee: The Braun Corporation, Winamac, IN (US)

( * ) Notice: Subject to any disclaimer, the term of this patent is extended or adjusted under 35 U.S.C. 154(b) by 0 days.

(21) Appl. No.: 09/564,226

(22) Filed: May 3, 2000

(51) Int. Cl.$^7$ .................................................. A61G 3/08
(52) U.S. Cl. ...................... 414/540; 414/541; 414/558; 414/921
(58) Field of Search ................................ 414/540, 921, 414/541, 558

(56) References Cited

U.S. PATENT DOCUMENTS

| | | | |
|---|---|---|---|
| 2,683,540 A | 7/1954 | Wood | |
| 2,696,923 A | 12/1954 | Messick | |
| 4,273,217 A | 6/1981 | Kajita | |
| 4,353,436 A | 10/1982 | Rice et al. | |
| 4,474,527 A | 10/1984 | Risner et al. | |
| 4,561,823 A | * 12/1985 | Norton | 414/921 X |
| 4,718,812 A | 1/1988 | Smalley et al. | 414/540 |
| 4,804,308 A | 2/1989 | Hamblin et al. | |
| 4,958,979 A | * 9/1990 | Svensson | 414/921 X |
| 4,984,955 A | * 1/1991 | McCullough | 414/921 X |
| 5,052,879 A | 10/1991 | Wolfe | 414/541 |
| 5,092,722 A | 3/1992 | Reazer, III et al. | 410/104 |
| 5,110,252 A | 5/1992 | Aoki | 414/549 |
| 5,180,275 A | 1/1993 | Czech et al. | 414/541 |
| 5,253,973 A | * 10/1993 | Fretwell | 414/541 X |
| 5,259,081 A | 11/1993 | Henderson | 14/71.1 |
| 5,261,779 A | 11/1993 | Goodrich | |
| 5,331,701 A | 7/1994 | Chase et al. | 14/71.1 |
| 5,382,130 A | 1/1995 | Kempf | |
| 5,401,135 A | 3/1995 | Stoen et al. | 414/546 |
| 5,433,581 A | 7/1995 | Farsai | 414/546 |
| 5,556,250 A | 9/1996 | Fretwell et al. | 414/558 |
| 5,564,884 A | 10/1996 | Farsai | 414/540 |
| 5,672,041 A | 9/1997 | Ringdahl et al. | 414/545 |
| 5,870,788 A | 2/1999 | Witkin | 14/69.5 |
| 5,871,329 A | 2/1999 | Tidrick et al. | 414/537 |
| 5,975,830 A | * 11/1999 | Goodrich et al. | 414/921 X |
| 6,039,528 A | 3/2000 | Cohn | |
| 6,062,805 A | 5/2000 | Tremblay et al. | |
| 6,203,266 B1 | 3/2001 | Savaria et al. | |
| 6,305,897 B1 | 10/2001 | Budd et al. | |

FOREIGN PATENT DOCUMENTS

| | | | | |
|---|---|---|---|---|
| CA | 2110137 | * | 5/1995 | 414/921 |
| EP | 0 629 524 A1 | | 12/1994 | |
| EP | 0 629 524 B1 | | 12/1994 | |
| GB | 2107671 | * | 5/1983 | 414/558 |

* cited by examiner

*Primary Examiner*—Steven A. Bratlie
(74) *Attorney, Agent, or Firm*—Woodard, Emhardt, Naughton, Moriarty & McNett

(57) ABSTRACT

A wheelchair lifting platform for transporting a wheelchair passenger into and out of the rear door of a vehicle such as a van. The platform may be folded and stowed beneath the floor of the van behind the rear axle. The platform further includes rollstops pivotally coupled to the ends of the platform and adapted to automatically deploy when the platform is unfolded. A pivoting housing cover is also included that is adapted to open upon deployment of the platform and close upon stowage of the platform in its housing beneath the vehicle.

23 Claims, 8 Drawing Sheets

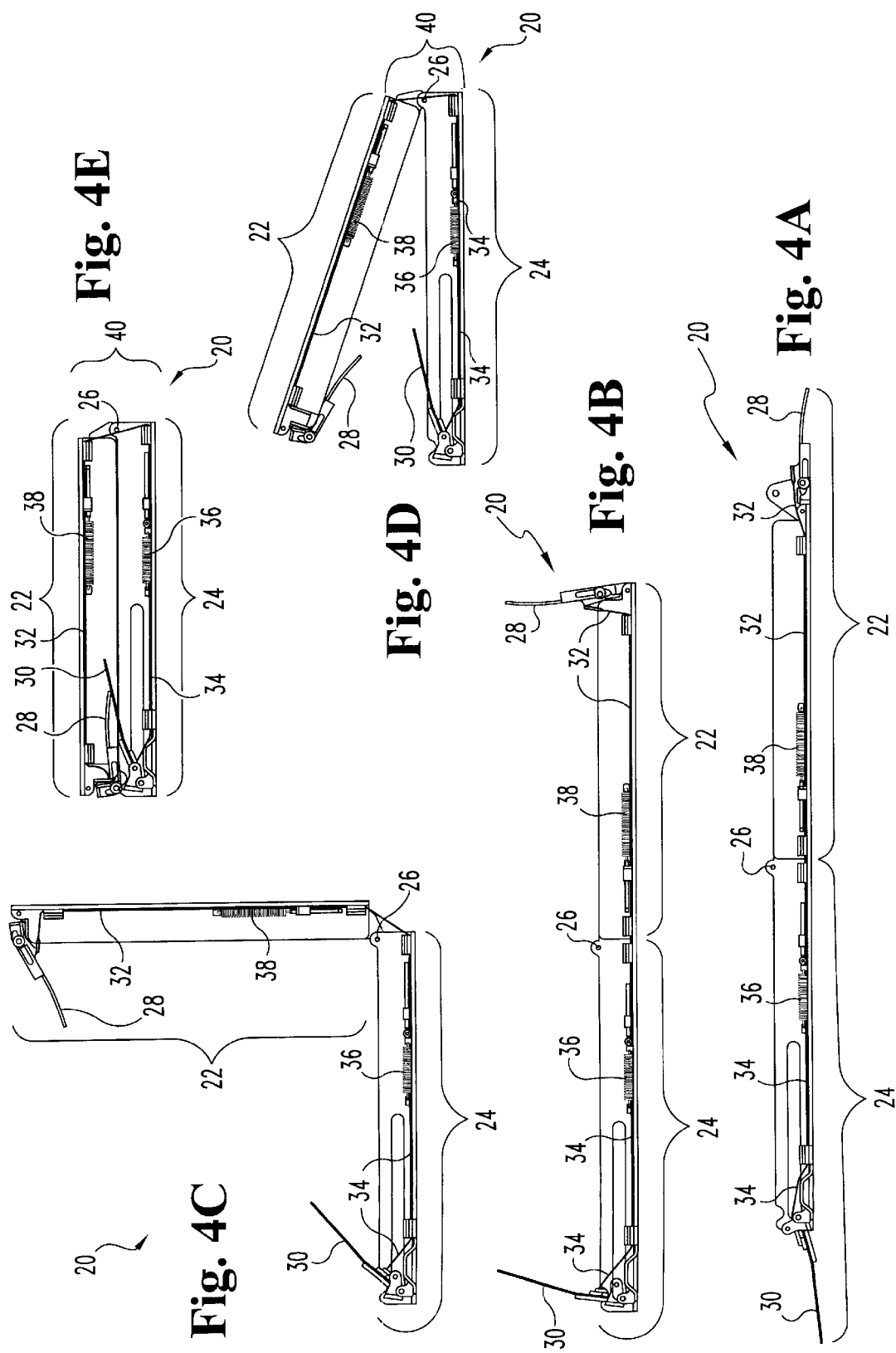

UNDER-VEHICLE LIFT WITH FOLDING PLATFORM

TECHNICAL FIELD OF THE INVENTION

The present invention relates generally to the field of mechanical lifts, and more specifically to a wheelchair lift having a platform capable of being folded and stowed beneath the rear portion of a vehicle.

BACKGROUND OF THE INVENTION

People confined to wheelchairs require special transportational needs. Among these needs are vehicles equipped with ramps or lifting platforms for allowing wheelchair passengers to enter and/or exit or disembark the vehicle while in their wheelchairs. Wheelchair accessible vehicles are desirable not only to the wheelchair passengers themselves, but also to those who want to shuttle disabled customers to and from their businesses, such as hotels and airports. While there are a wide variety of wheelchair accessible vehicles for the wheelchair passenger to chose from for their own personal use, airport and hotel shuttle fleets tend to favor vans (including minivans), since these shuttles typically have to transport small groups of luggage-laden travelers over short distances.

Vans are attractive for the transportation of wheelchair passengers since they can be readily adapted to accommodate a passenger in a wheelchair. One convenient location for the wheelchair passenger is in the rear section of the van, where there is enough room to transport the wheelchair passenger while seated in the wheelchair. However, stowage of the wheelchair-lifting platform becomes an issue.

It is desirable to avoid stowing the wheelchair-lifting platform in the rear of the van, since that space is normally at a premium for storing passenger luggage. It is difficult to position a wheelchair lift platform under the rear of a van because the rear axle interferes with the stowage of the platform. There is not enough room under most vehicles between the rear axle and the rear door to stow a known wheelchair lifting platform when not in use. Therefore, there remains a need for a wheelchair-lifting platform that can be stowed under the rear of a van when not in use. The present invention addresses this need.

SUMMARY OF THE INVENTION

The present invention relates to a wheelchair-lifting platform for transporting a passenger seated in a wheelchair back and forth between the rear door of a van and the ground that can be stored below the rear of the van when not in use. One embodiment of the present invention is a manually folding and unfolding platform having rollstops that automatically actuate upon the unfolding of the platform and automatically retract upon the folding of the platform. The platform is folded and stored beneath the rear floor of the van and behind the rear axle when not in use.

One object of the present invention is to provide an improved wheelchair-lifting platform. Related objects and advantages of the present invention will be apparent from the following description.

BRIEF DESCRIPTION OF THE DRAWINGS

FIG. 4A is a side elevational schematic view of FIG. 1A wherein the rollstops are fully extended.

FIG. 4B is a side elevational schematic view of FIG. 1A wherein the rollstops have been partially retracted.

FIG. 4C is a side elevational schematic view of FIG. 2A.

FIG. 4D is a side elevational schematic view of FIG. 1A wherein the platform has been three-quarters folded.

FIG. 4E is a side elevational schematic view of FIG. 3A.

DETAILED DESCRIPTION OF THE PREFERRED EMBODIMENT

Figure 1A:
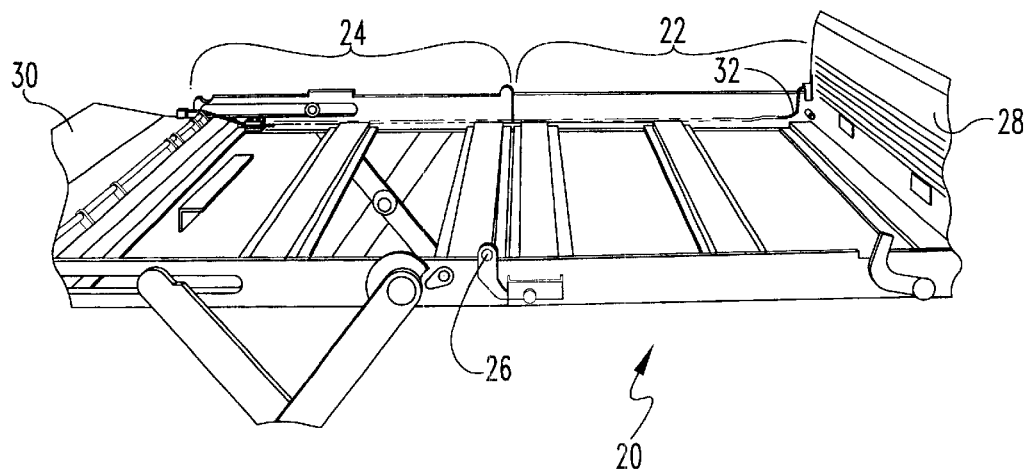
FIG. 1A is a perspective view of a first embodiment of the present invention, a foldable wheelchair lift platform.
Figure 1C:
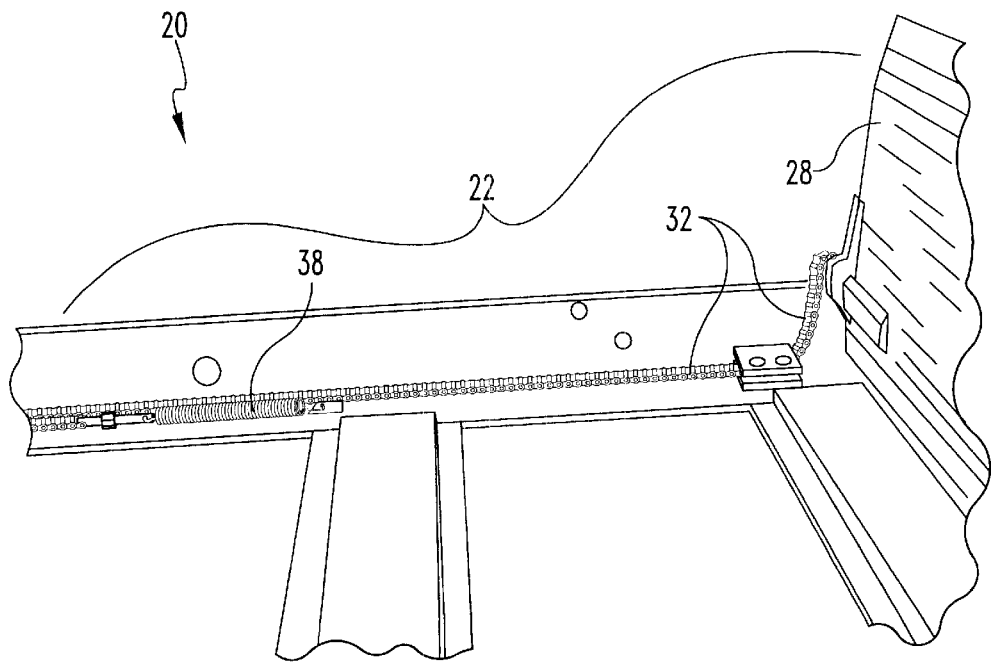
FIG. 1C is a second partial perspective view of FIG. 1A.
Figure 1B:
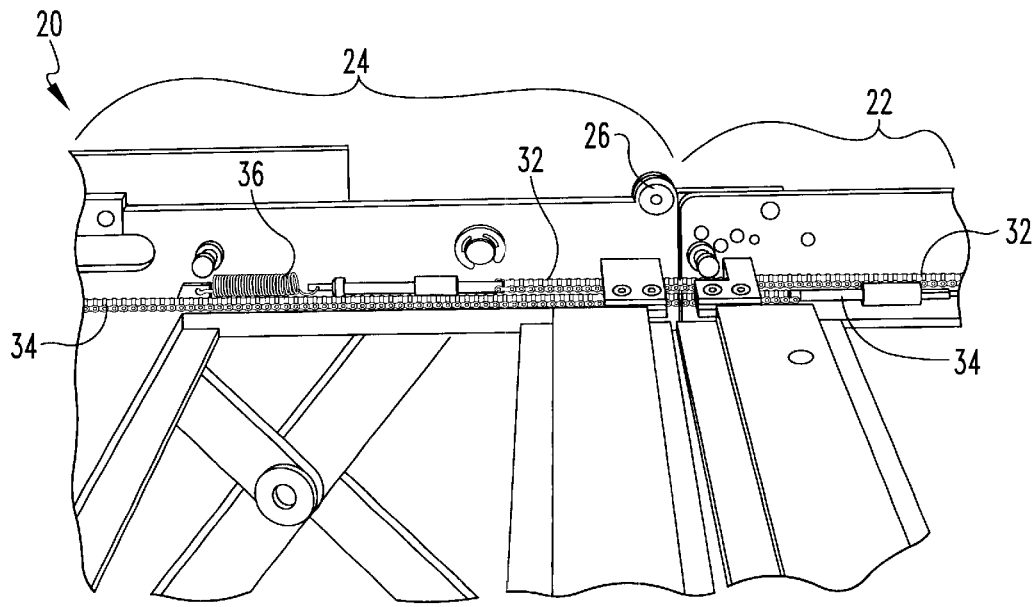
FIG. 1B is a partial perspective view of the embodiment of FIG. 1A.
Figure 1D:
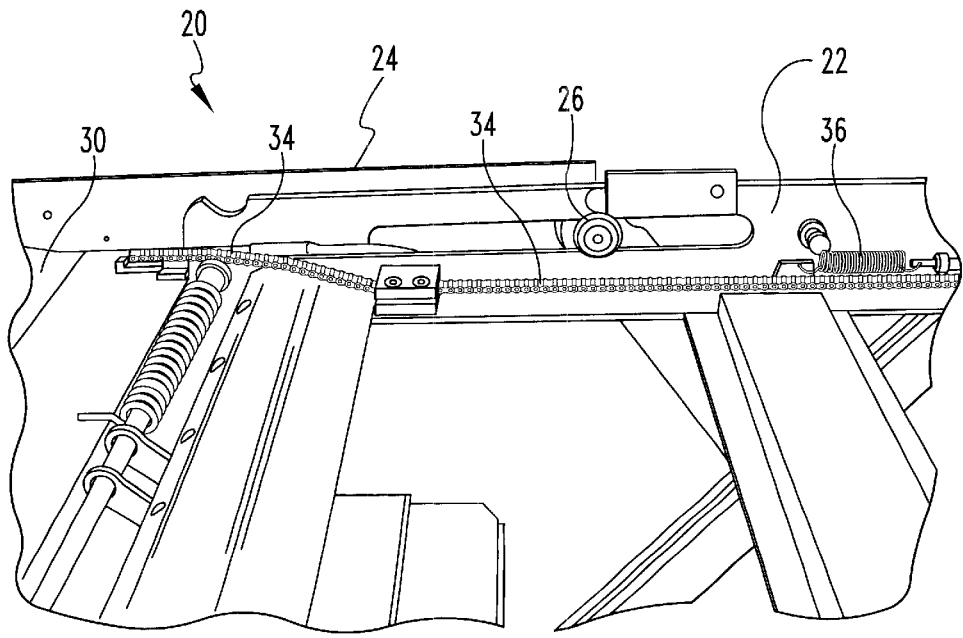
FIG. 1D is a third partial perspective view of FIG. 1A.
Figure 2B:
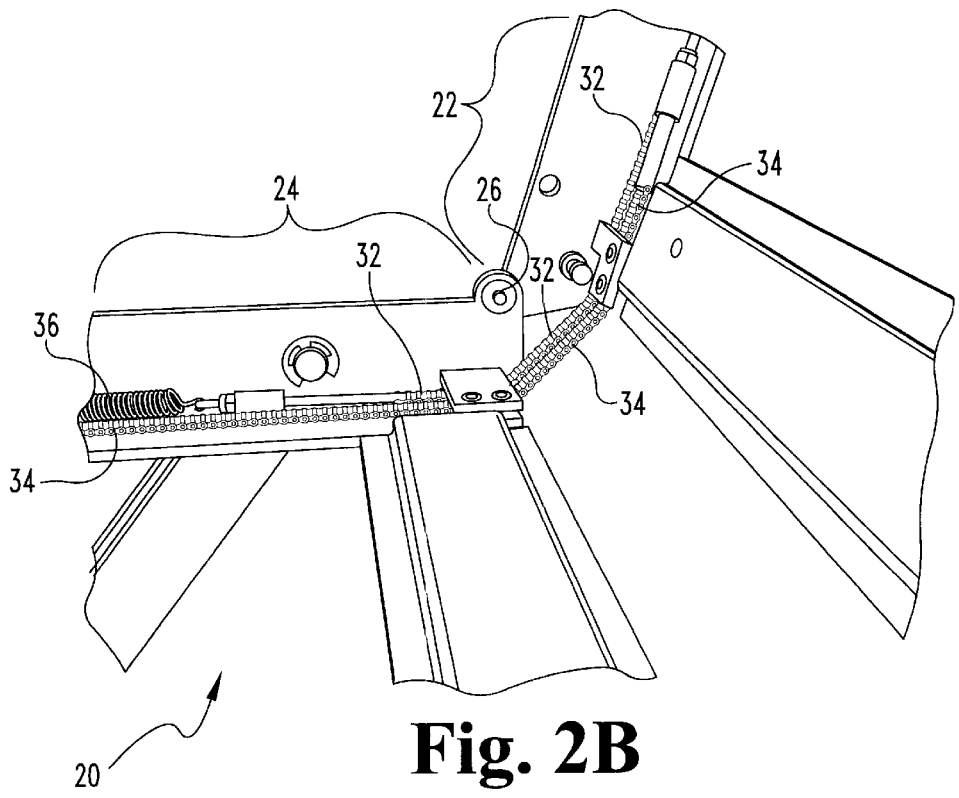
FIG. 2B is a partial perspective view of FIG. 2A.
Figure 2A:
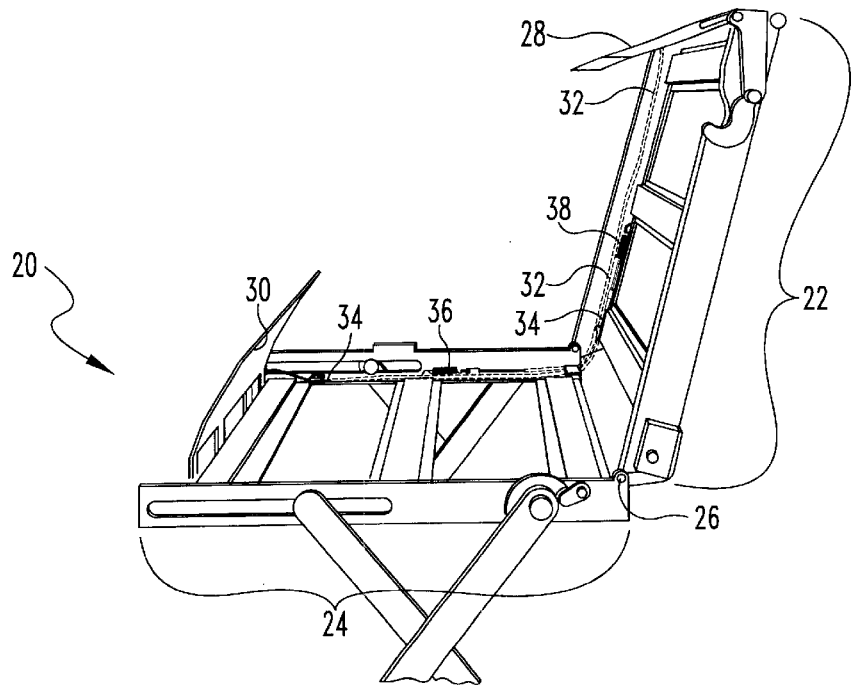
FIG. 2A is a perspective view of FIG. 1A having been partially folded.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

One embodiment of the present invention relates to a wheelchair lift for use with vans or minivans, having a rear door wherein the wheelchair lift includes a manually foldable/unfoldable platform adapted to be stowed under the vehicle floor and behind the rear axle. FIGS. 1–4 illustrate the preferred embodiment of the present invention, a platform 20 having a first platform portion 22 pivotally coupled to a second platform portion 24. In the preferred embodiment, the platform portions 22, 24 are pivotally coupled at hinge 26, although any convenient pivotal coupling means may be chosen. At least one rollstop member is pivotally connected to the platform 20. The preferred embodiment contemplates two rollstop members 28, 30, respectively coupled to the extended ends of platform portions 22, 24.

Referring to FIGS. 1A–D and 4A–B, a preferred embodiment is illustrated having a first rollstop member 28 pivotally connected to the extended end of first platform portion 22 and a second rollstop member 30 pivotally connected to the extended end of second platform portion 24. The rollstop members 28, 30 are pivotally connected to respective platform portions 22, 24 and are also connected to the opposite respective platform portions 24, 22 by flexible connectors 32, 34. In the preferred embodiment, flexible connectors 32, 34 are chains, although any convenient flexible connector, such as a wire, cord, cable, or the like may be chosen. The connector 32 extends from the rollstop 28, traverses the platform portion 22 the rollstop 28 is connected to, and connects to the other platform portion 24. Likewise, connector 34 extends from the rollstop 30, traverses the platform portion 24 the rollstop 30 is connected to, and connects to the other platform portion 22. In the preferred embodiment, a first flexible connector 32 operationally couples first rollstop member 28 to second platform portion 24, extending across first platform portion 22 and hinge 26. Likewise, a second flexible connector 34 operationally couples second rollstop member 30 to first platform portion 22, extending across second platform portion 24 and hinge 26.

Flexible connectors 32, 34 may be coupled to platform 20 via tension members 36, 38, respectively. Tension members 36, 38 take up the slack in flexible connectors 32, 34 when the rollstops 28, 30 are pivoted and/or the platform 20 is folded. The preferred embodiment contemplates tension members 36, 38 as springs, but any convenient mechanical member capable of exerting tension on connectors 32, 34 may be chosen.

Figure 3A:
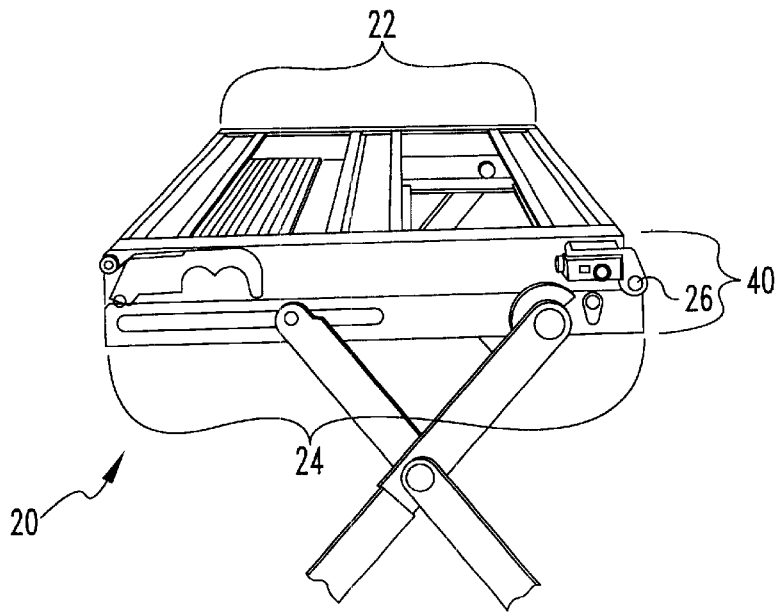
FIG. 3A is a perspective view of FIG. 1A having been completely folded.
Figure 3B:
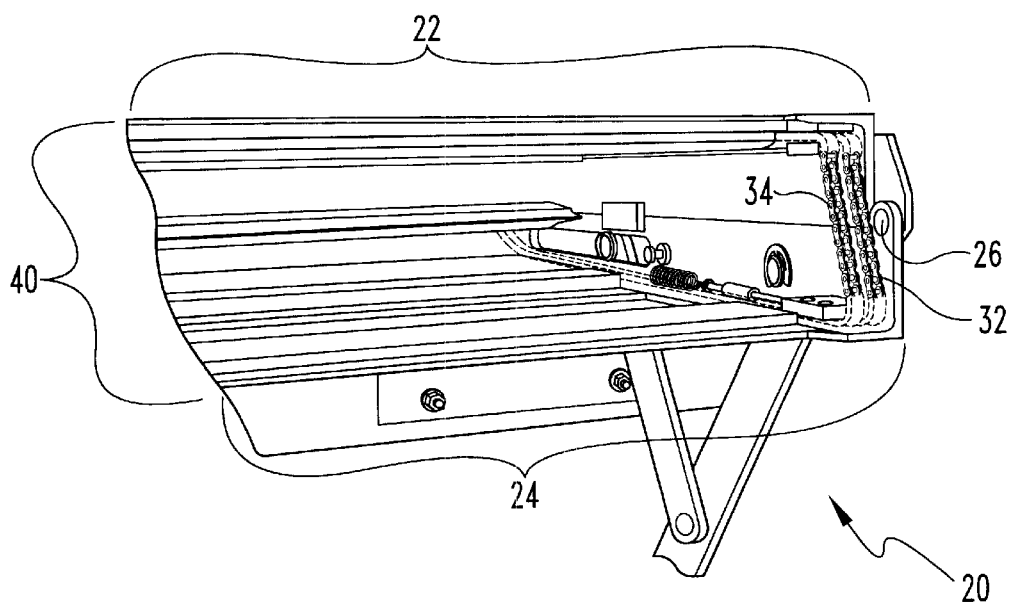
FIG. 3B is a partial perspective view of FIG. 3A.
Figure 5A:
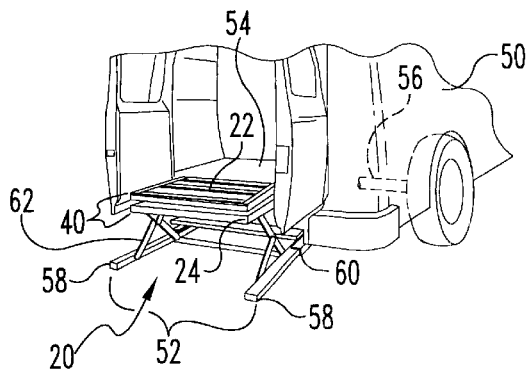
FIG. 5A is a partial perspective of a second embodiment of the present invention, an unstowed folded foldable wheelchair lift platform mounted under the rear floor of a van.
Figure 5B:
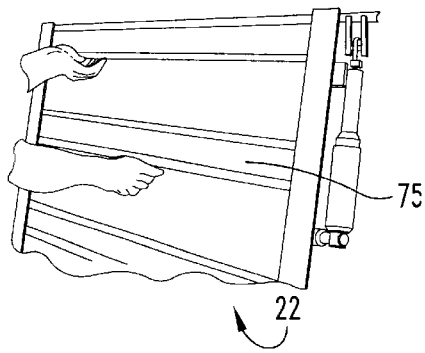
FIG. 5B is a partial perspective view of FIG. 5A being unfolded.
Figure 5D:
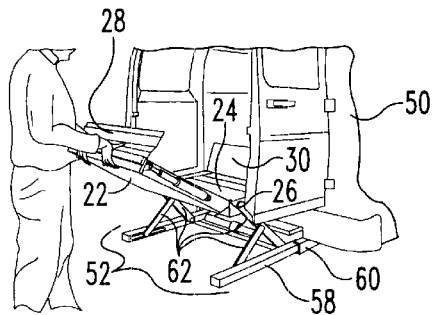
FIG. 5D is a partial perspective view of FIG. 5A being yet further unfolded.
Figure 5C:
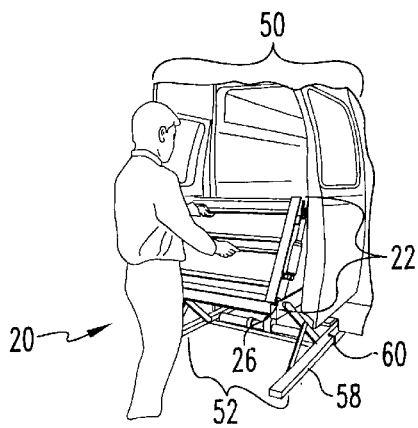
FIG. 5C is a partial perspective view of FIG. 5A being further unfolded.
Figure 5E:
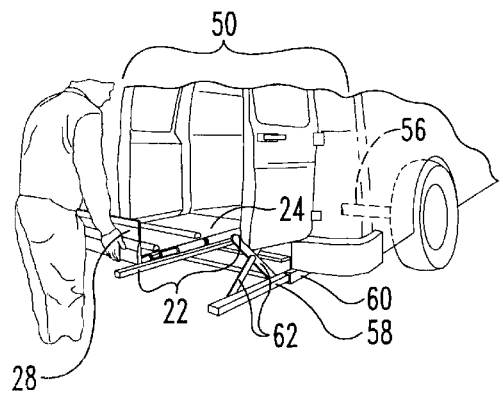
FIG. 5E is a partial perspective view of FIG. 5A completely unfolded.

FIGS. 2A, 2B, 4C, and 4D illustrate a partially folded platform 20, while FIGS. 3A and 3B illustrate a completely folded platform 20. During folding, first platform portion 22 is pivoted about hinge 26 towards second platform portion 24. Hinge 26 is located on the top edge of platform 20, such that upon folding an edge 40 is formed with a folded length of about twice the platform thickness. Flexible connectors 32, 34 extending across folding edge 40 experience increasing tension as platform 20 is folded because the flexible connectors 32, 34 must now traverse the extra distance of the edge 40. The tension exerted on flexible connectors 36, 38, actuates a retraction of rollstops 28, 30, pivoting rollstops 28, 30 into platform 20. When platform 20 is folded, as illustrated in FIGS. 3A, 3B, and 4E, rollstops are automatically retracted from their deployed orientation, extending away from platform 20, to a retracted stowage orientation, lying flush against platform 20.

FIGS. 5A–5E illustrate another embodiment of the present invention wherein platform 20 is mounted beneath the rear of a van 50. A support structure 52 is mounted below the rear floor portion 54 and behind the rear axle 56 of van 50 for receiving folded platform 20. Support structure 52 includes a pair of slideable support members 58 disposed in tracks 60 formed in support structure 52, and is adapted to slideably receive folded platform 20 for stowage. Slideable support members 58 are connected to second platform portion 24 by a respective pair of lifting members 62. Lifting members 62 are adapted to raise and lock platform 20 into position for wheelchair communication with the interior of van 50 and are further adapted to lower platform 20 to the ground. In use, folded platform 20 is manually pulled horizontally outwardly from its stowage position, raised and locked. Alternately, folded platform 20 may be mechanically deployed and/or stowed by any convenient motor means. After folded platform 20 is in position for wheelchair communication with the vehicle interior, platform 20 is manually unfolded by pivoting first platform portion 22 outwardly about hinge 26 until first platform portion 22 is substantially coplanar with and substantially adjacent to second platform portion 24.

Rollstops 28, 30 may both be biased to deploy into an extended position parallel to platform 20 to allow wheelchair access upon unfolding of platform 20. Alternately, rollstops 28, 30 may both be biased to deploy into a partially retracted position perpendicular to platform 20 upon the unfolding thereof, to guard against inadvertent loading/ unloading of a wheelchair. Still alternately, one rollstop 28(30) may be biased to deploy into an extended position upon unfolding of platform 20 while the other rollstop 30(28) is biased to deploy into a partially retracted position, so as to enable a wheelchair board the platform from either the vehicle interior or the ground. Once platform 20 is manually unfolded, platform 20 is now in condition to either receive a wheelchair from within van 50 for transportation to the ground (if rollstop 30 is extended), or be lowered to the ground to receive a wheelchair for transportation into van 50 (if rollstop 28 is extended.)

Figure 6:
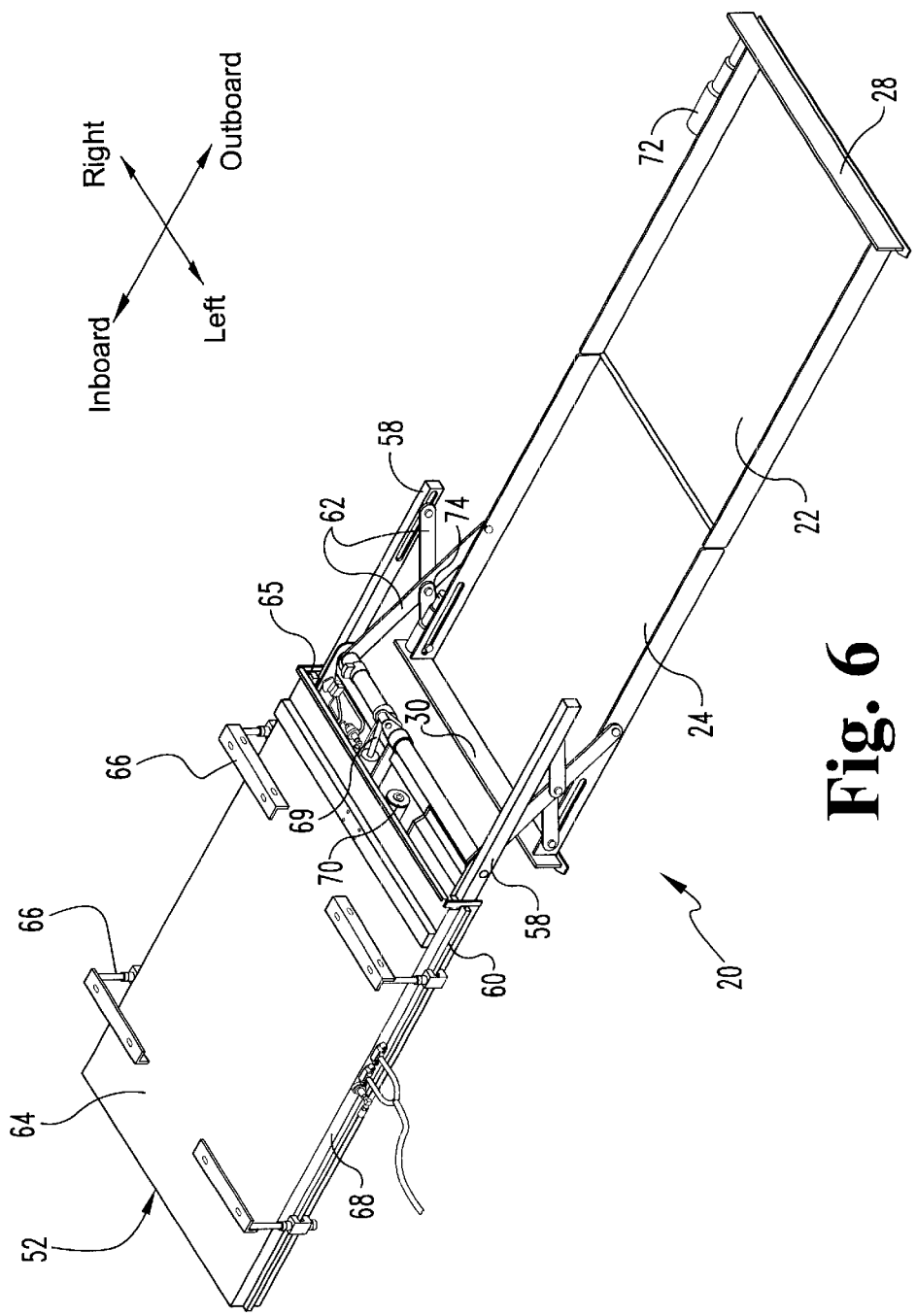
FIG. 6 is a perspective schematic view of FIG. 1A coupled to a housing.

FIG. 6 illustrates platform 20 and support structure 52 in detail. In addition to pair of slideable support members 58, tracks 60, and lifting members 62, support structure 52 includes a housing 64 adapted to receive folded platform 20. Housing 64 is mountable to the underside of a shuttle vehicle by a set of mounting brackets 66 connected thereto. Housing 64 preferably has the shape of a narrow, elongated rectangular box, with an opening 65 at the front end. Tracks 60 are formed in the sidewalls 68 of housing 64 and are adapted to interlockingly receive slideable support members 58 such that slideable support members 58 are substantially restricted from any movement except extending out of housing 64 and retracting into housing 64 along tracks 60. When platform 20 is stowed in housing 64, slideable support members 58 are substantially recessed into housing 64. When platform 20 is extended for use, slideable support members 58 extend substantially, but not completely, beyond housing 64. The portions of slideable support members 58 remaining within housing 64 and interlocked in tracks 60 are able to support the combined weight of platform 20, a wheelchair, and its occupant.

Support structure 52 further includes a hydraulic actuating cylinder 69 operationally connected to lifting members 62 and adapted to move platform 20 between the ground and the level of the interior of a shuttle vehicle. Support structure 52 may also include a chain drive motor assembly 70 for moving the folded platform 20 into and out of housing 64.

Platform 20 further includes an outboard rollstop actuator 72 and an inboard rollstop actuator 74, each respectively adapted to extend and retract first and second rollstops 28, 30 upon actuation, as is known in the art. Rollstops 28, 30 may be biased by actuators 72, 74 to extend to either an entry/exit position (fully extended with respect to platform 20) or a transport position (oriented at substantially right angles to platform 20 to prevent a wheelchair thereon from rolling off). The exterior side of first platform portion 22 further includes at least one handgrip or hand hold 75 for easy manipulation, folding, and unfolding of platform 20.

Figure 7A:
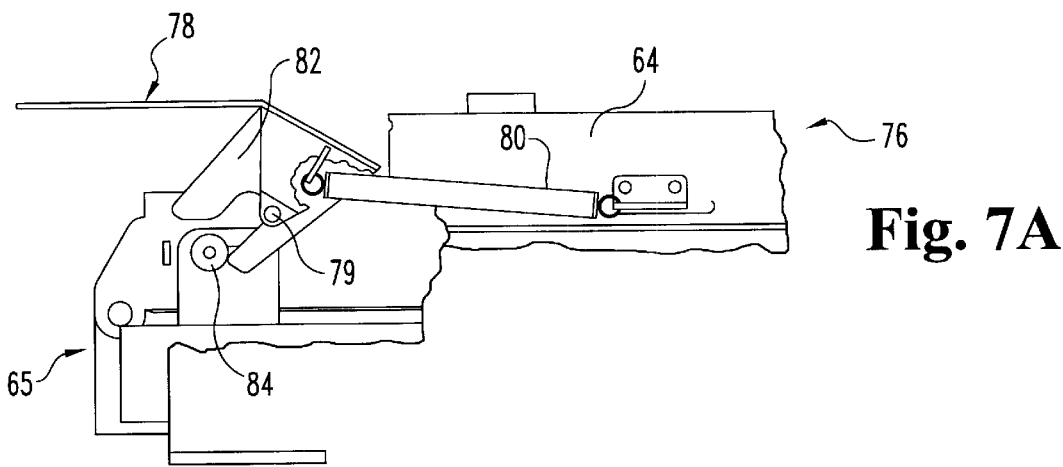
FIG. 7A is a side elevational schematic view of a hatch cover assembly coupled to the embodiment of FIG. 5A and pivoted open.
Figure 7B:
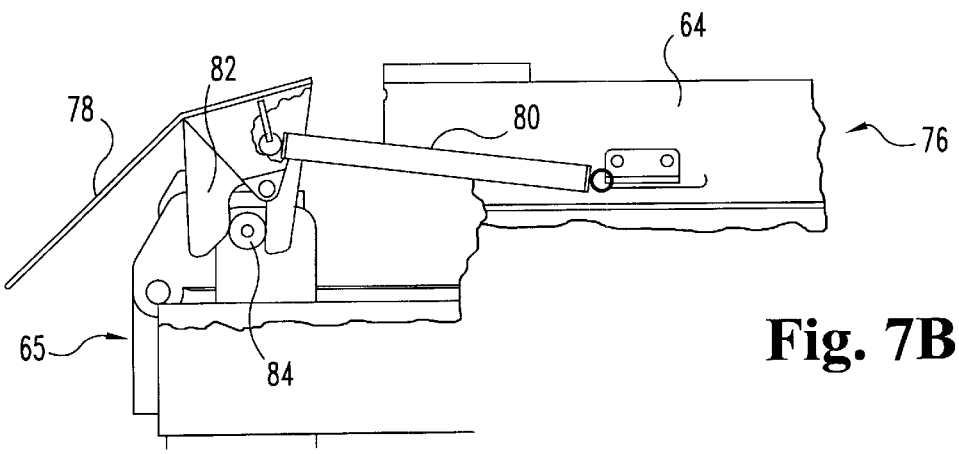
FIG. 7B is a side elevational schematic view of a hatch cover assembly, pivoted partially open.
Figure 7C:
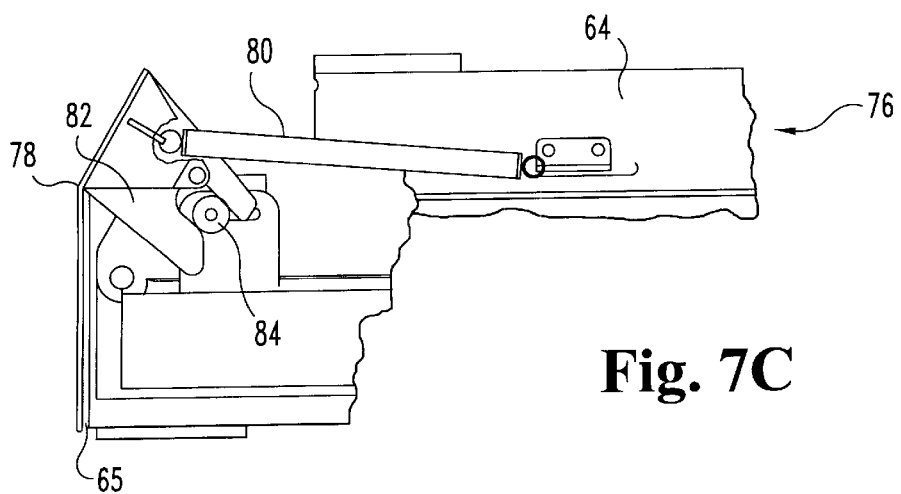
FIG. 7C is a side elevational schematic view of a hatch cover assembly pivoted closed.

Support structure 52 further includes a hatch cover assembly 76 illustrated in FIGS. 7A–7C. Hatch cover assembly 76 includes hatch cover 78 pivotally coupled to housing 64 by pin 79 and adapted to cover housing opening 65. Hatch cover 78 is adapted to pivot around pin 79 between a closed position wherein hatch cover 78 rests substantially against opening 65 and an open position wherein hatch cover 78 pivots up and away from opening 65. Hatch cover 78 is preferably biased in the open position by biasing member 80, connecting hatch cover 78 to support structure 58. Biasing member 80 is preferably a spring, but may be any convenient device capable of exerting a biasing force on hatch cover 78. Hatch cover assembly 76 further includes a cam follower member 82 interiorly connected to hatch cover 78. Cam follower 82 is adapted to engage a cam or roller 84 connected to platform 20. As platform 20 is recessed into housing 64, cam 84 engages cam follower 82, transducing a portion of the translational energy of platform 20 into rotational energy of hatch cover 78 and thereby actuating pivoting of hatch cover 78 from the open position to the closed position. Likewise, when platform 20 is extended from its stowed position, cam 84 engages cam follower 82 and actuates pivoting of hatch cover 78 from the closed position to the open position.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A wheelchair lift, comprising:
   a foldable platform having a first platform portion foldably coupled to a second platform portion;
   a first rollstop portion pivotally coupled to said first platform portion;
   a first flexible connector extending along said first platform portion and operationally connecting said first rollstop portion to said second platform portion;
   a second rollstop portion pivotally coupled to said second platform portion; and
   a second flexible connector extending along said second platform portion and operationally connecting said second rollstop portion to said first platform portion;
   wherein folding said platform exerts tension on said respective first and second flexible connectors, retracting said respective second and first rollstop portions.

2. The wheelchair lift of claim 1 further comprising a first tension member coupled to said first rollstop portion and a second tension member coupled to said second rollstop portion, wherein said respective first and second tension members bias said respective first and second rollstop portions into a deployed orientation.

3. The wheelchair lift of claim 1 further comprising a handgrip formed in said first platform portion.

4. The wheelchair lift of claim 1 wherein said platform is adapted to be manually folded.

5. The wheelchair lift of claim 1 further comprising:
   a first tension member coupled to said first rollstop portion;
   a second tension member coupled to said second rollstop portion; and
   a handgrip formed in said first platform portion;
   wherein said respective first and second tension members bias said respective first and second rollstop portions into a deployed orientation; and
   wherein said platform is adapted to be manually folded.

6. A wheelchair lift system, comprising:
   a vehicle;
   a rear door formed in said vehicle;
   a rear axle formed in said vehicle;
   a rear floor portion formed in said vehicle and extending between said rear axle and said rear door;
   a support structure mounted below said rear floor portion;
   a hinged foldable platform slideably mounted in said support structure;
   at least one rollstop portion pivotally coupled to platform and adapted to retract from a deployed orientation to a stowage orientation when said platform is folded; and
   a hinged cover pivotally coupled to said rear floor portion;
   wherein said hinged cover may pivot between an open position and a closed position;
   wherein said platform may be moved between a stowed position under said rear floor portion and an extended position;
   wherein moving said folded platform into said stowed position under said rear floor portion actuates pivoting of said cover into said closed position;
   a biasing member coupling said hinged cover to said support structure and biasing said hinged cover in said open position;
   an engaging member connected to said hinged foldable platform; and
   a cam connected to said hinged cover and adapted to engage said engaging member when said hinged foldable platform is moved into said stowed position, actuating pivoting of said hinged cover into said closed position.

7. The wheelchair lift system of claim 6 further comprising:
   a first tension member coupled to said at least one rollstop portion biasing said at least one rollstop portion in said deployed orientation.

8. The wheelchair lift system of claim 6 wherein said stowed position is under said rear floor portion and behind said rear axle.

9. A wheelchair lift, comprising:
   a first platform portion;
   a second platform portion foldably coupled to said first platform portion;
   a rollstop portion pivotally coupled to said first platform portion;
   a flexible connector extending along said platform and operationally connecting said rollstop portion to said second platform portion;
   wherein folding said platform exerts tension on said flexible connector, retracting said rollstop portion.

10. The wheelchair lift of claim 9 further comprising a tension member coupled to said rollstop portion, wherein said tension member biases said rollstop portion into a deployed orientation.

11. The wheelchair lift of claim 9 further comprising a handgrip formed in said first platform portion.

12. The wheelchair lift of claim 9 wherein said platform is adapted to be manually folded.

13. The wheelchair lift of claim 9 further comprising:
   a tension member coupled to said rollstop portion; and
   a handgrip formed in said first platform portion;
   wherein said tension member biases said rollstop portion into a deployed orientation; and
   wherein said platform is adapted to be manually folded.

14. A wheelchair lifting platform for transporting wheelchair passengers into and out of a door of a vehicle, comprising:

a support structure adapted to be mounted beneath a rear portion of the vehicle floor and behind the vehicle rear axle;

a manually foldable platform slideably coupled to said support structure; and a rollstop member hingedly connected to said manually foldable platform; and a flexible connector having two ends with one end connected to said rollstop member and the other end fixed to said platform;

wherein said rollstop member is adapted to pivotally retract when said platform is folded.

15. The wheelchair lifting platform of claim 14 further comprising:

a hinge portion formed in said platform; and a flexible connector extending along said foldable platform and crossing said hinge portion;

wherein said flexible connector retractably connects said rollstop member to said foldable platform and wherein folding said platform exerts tension on said flexible connector, pivotally retracting said rollstop member.

16. The wheelchair lift of claim 14 further comprising a biasing member operationally connected to said rollstop member, wherein said biasing member biases said rollstop away from said platform.

17. The wheelchair lift of claim 14 wherein said platform is adapted to be slideably moved between a deployed position adjacent said support structure and a stowed position within said support structure when said platform is folded.

18. The wheelchair lift of claim 17 wherein said platform includes a cam and wherein said support structure includes a hinged cover and wherein said hinged cover includes a cam follower adapted to engage said cam when said folded platform is slideably moved into said stowed position.

19. The wheelchair lift of claim 14 wherein said manually foldable platform has a stowed position, and further comprising:

a hinge portion formed in said manually foldable platform;

a flexible connector extending along said manually foldable platform and crossing said hinge portion;

a biasing member operationally connected to said rollstop member;

a hinged cover pivotably connected to the shuttle vehicle;

a cam extending from said manually foldable platform; and a cam follower extending from said hinged cover;

wherein said cam is adapted to engage said cam follower when said manually foldable platform is moved into the stowed position;

wherein said biasing member biases said rollstop member away from said manually foldable platform;

wherein said flexible connector retractably connects said rollstop member to said manually foldable platform; and wherein folding said manually foldable platform exerts tension on said flexible connector to pivotally retract said rollstop member.

20. A wheelchair lift for a vehicle, comprising:

a support structure mounted below the floor of the vehicle and having an opening;

a hinged foldable platform slideably mounted in said support structure and movable between a stowed position under the floor of the vehicle and an extended position, said platform including a first engaging member;

a pivotal cover located proximate the opening of said support structure and pivotable between a first position in which said cover does not cover the opening and a second position in which said cover covers the opening, said cover including a second engaging member configured and adapted to engage said first engaging member when said platform is moved into the stowed position;

wherein said first engaging member and said second engaging member coact to pivot said cover to cover the opening when said platform is moved to the stowed position.

21. The wheelchair life of claim 20, wherein said platform includes a first platform portion foldably coupled to a second platform portion and which further comprises:

a first rollstop pivotally coupled to said first platform portion;

a first flexible connector operationally connecting said first rollstop to said second platform portion;

a second rollstop pivotally coupled to said second platform portion; and a second flexible connector operationally connecting said second rollstop to said first platform portion;

wherein folding said platform exerts tension on said respective first and second flexible connectors and retracts said respective second and first rollstops.

22. The wheelchair lift system of claim 21 which further comprises:

a first tension member coupled to said first rollstop and biasing said first rollstop in said deployed orientation; and a second tension member coupled to said second rollstop and biasing said second rollstop in said deployed orientation.

23. The wheelchair lift system of claim 20 wherein one of said first engaging member or said second engaging member is a cam, and the other of said first engaging member or said second engaging member is a cam follower.

* * * * *